(12) United States Patent
Lammlein, Jr.

(10) Patent No.: US 8,221,573 B2
(45) Date of Patent: Jul. 17, 2012

(54) METHOD AND APPARATUS FOR BUILDING A PUNCTURE SEALANT PREASSEMBLED COMPONENT

(75) Inventor: Robert Albert Lammlein, Jr., Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 430 days.

(21) Appl. No.: 12/244,270

(22) Filed: Oct. 2, 2008

(65) Prior Publication Data
US 2009/0159182 A1   Jun. 25, 2009

Related U.S. Application Data

(60) Provisional application No. 61/016,295, filed on Dec. 21, 2007.

(51) Int. Cl.
  *B29C 47/00* (2006.01)
  *B29C 73/16* (2006.01)
  *B29C 73/22* (2006.01)
  *B60C 19/12* (2006.01)

(52) U.S. Cl. .......... 156/244.11; 156/110.1; 156/115; 156/244.22; 156/244.24; 156/244.27; 264/171.11; 264/171.24; 152/505; 152/507

(58) Field of Classification Search .......... 156/115, 156/246, 244.27, 152, 304.3, 244.11, 244.24, 156/244.22, 126, 110.1; 428/912; 152/502–507; 264/171.11, 171.24, 171.1, 172.19
See application file for complete search history.

(56) References Cited

U.S. PATENT DOCUMENTS

| | | | | |
|---|---|---|---|---|
| 1,959,460 A * | 5/1934 | Crossan | ............ | 156/115 |
| 2,244,648 A * | 6/1941 | Carnahan | ............ | 156/115 |
| 2,877,819 A | 3/1953 | Gibbs | ............ | 152/347 |
| 4,106,965 A | 8/1978 | Lee | ............ | 156/123 R |
| 4,206,796 A * | 6/1980 | Chemizard | ............ | 152/505 |
| 4,388,261 A | 6/1983 | Codispoti et al. | ............ | 264/171 |
| 4,895,610 A | 1/1990 | Egan | ............ | 156/115 |
| 5,882,456 A * | 3/1999 | Kohne | ............ | 156/129 |
| 6,837,287 B2 | 1/2005 | Smith, Sr. et al. | ............ | 152/503 |
| 7,073,550 B2 | 7/2006 | Reiter et al. | ............ | 152/503 |
| 2006/0169393 A1* | 8/2006 | Botts et al. | ............ | 156/115 |

FOREIGN PATENT DOCUMENTS

| | | |
|---|---|---|
| DE | 1 604 405 A1 | 2/1971 |
| DE | 10144524 A1 | 3/2003 |
| EP | 0485127 A1 | 5/1992 |
| EP | 1426201 A1 | 6/2004 |
| GB | 1583540 | 1/1981 |
| WO | WO 2005/095828 A1 | 10/2005 |

OTHER PUBLICATIONS

European Search Report completed Mar. 12, 2009.

* cited by examiner

*Primary Examiner* — William Bell
(74) *Attorney, Agent, or Firm* — June E. Rickey

(57) ABSTRACT

A method and apparatus for making a preassembly of built in sealant useful in tire manufacturing. The method of making the preassembled sealant includes extruding a center strip and at least two axially outer strips of a sealant onto a first conveyor belt; wherein the center strip and the axially outer strips are in a side by side adjacent relationship. Conveying the center strip onto a second conveyor while the axially outer strips are conveyed on the first conveyor belt towards the end of the belt, wherein the center strip has two outer edges, wherein a divider strip is applied to each other edge in a continuous manner, wherein the center strip is then conveyed onto the axially outer strips and then stitched together forming a preassembled component.

6 Claims, 3 Drawing Sheets

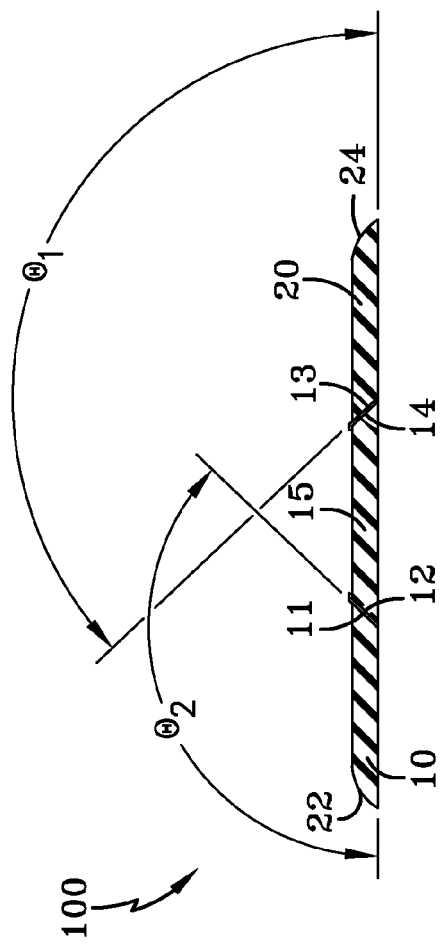
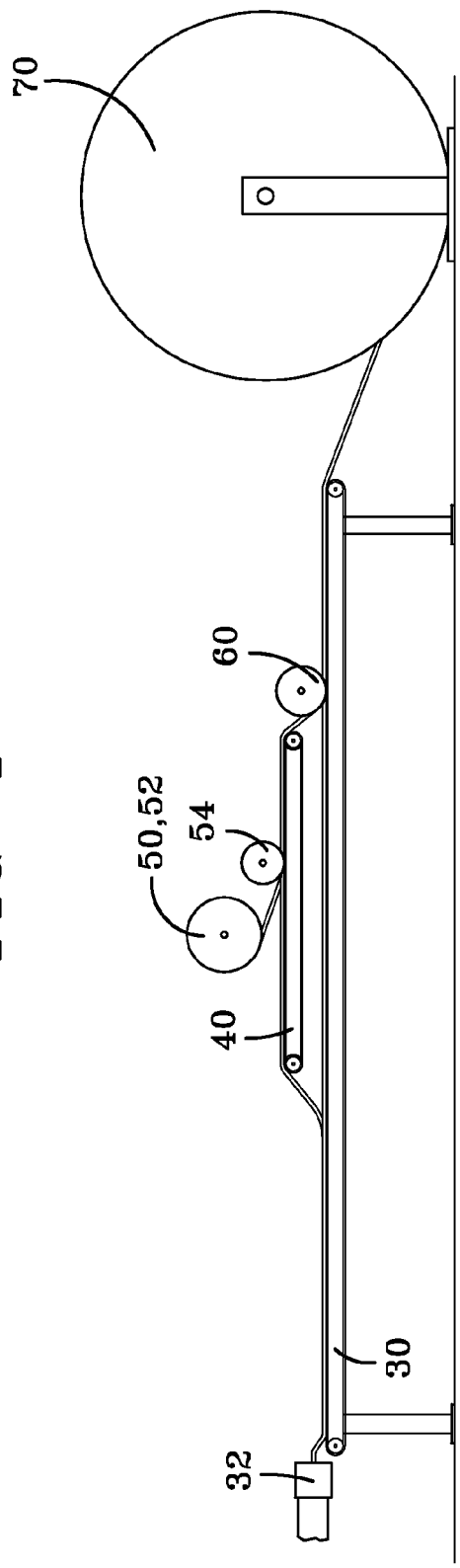

METHOD AND APPARATUS FOR BUILDING A PUNCTURE SEALANT PREASSEMBLED COMPONENT

This application claims the benefit of, and incorporates by reference, U.S. Provisional Application No. 61/016,295 filed Dec. 21, 2007.

TECHNICAL FIELD

This invention relates to a method and apparatus for making a puncture sealant assembly for use in a tire.

BACKGROUND OF THE INVENTION

It is known in the prior art to apply puncture sealants made of puncture sealing rubber or plastic material on the crown portion of the tire so that when a sharp object such as a nail pierces the tire, the tire sealant forms a seal around the puncture. Tire sealants of this nature tend to flow or be soft resulting in a tendency to migrate towards the center portion of the tire due to centrifugal force as the tire is rotated at high speeds. Thus the outer portions of the crown have reduced sealant volume due to migration of the sealant towards the center. It is known in the prior art to compartmentalize a sealant into multiple cells such as shown in U.S. Pat. No. 2,877,819 or U.S. Pat. No. 4,388,261. One disadvantage to compartmentalizing the sealant into multiple cells is that the manufacturing process is costly. Further, having too many compartments may impede the effective flow of the sealant needed to seal a puncture. Further, using an extruder to manufacture the sealant into compartments is costly and requires additional manufacturing steps. Thus it is desired to provide a tire and a low cost manufacturing method for providing puncture sealant in a tire which does not migrate during use.

Definitions

"Aspect Ratio" means the ratio of a tire's section height to its section width.

"Axial" and "axially" mean the lines or directions that are parallel to the axis of rotation of the tire.

"Carcass" means a laminate of tire ply material and other tire components cut to length suitable for splicing, or already spliced, into a cylindrical or toroidal shape. Additional components may be added to the carcass prior to its being vulcanized to create the molded tire.

"Circumferential" means lines or directions extending along the perimeter of the surface of the annular tread perpendicular to the axial direction; it can also refer to the direction of the sets of adjacent circular curves whose radii define the axial curvature of the tread as viewed in cross section.

"Cord" means one of the reinforcement strands, including fibers, which are used to reinforce the plies.

"Inner Liner" means the layer or layers of elastomer or other material that form the inside surface of a tubeless tire and that contain the inflating fluid within the tire.

"Ply" means a cord-reinforced layer of elastomer-coated, radially deployed or otherwise parallel cords.

"Radial" and "radially" mean directions radially toward or away from the axis of rotation of the tire.

"Radial Ply Structure" means the one or more carcass plies or which at least one ply has reinforcing cords oriented at an angle of between 65° and 90° with respect to the equatorial plane of the tire.

"Radial Ply Tire" means a belted or circumferentially-restricted pneumatic tire in which the ply cords which extend from bead to bead are laid at cord angles between 65° and 90° with respect to the equatorial plane of the tire.

"Sidewall" means a portion of a tire between the tread and the bead.

"Skive" or "skive angle" refers to the cutting angle of a knife with respect to the material being cut; the skive angle is measured with respect to the plane of the flat material being cut.

"Laminate structure" means an unvulcanized structure made of one or more layers of tire or elastomer components such as the innerliner, sidewalls, and optional ply layer.

BRIEF DESCRIPTION OF THE DRAWINGS

The structure, operation, and advantage of the invention will become further apparent upon consideration of the following description taken in conjunction with the accompanying drawings wherein:

FIG. 4 is a cross sectional view of a second embodiment of the sealant and barrier preassembly;

FIG. 5 is a schematic view of a second embodiment of an assembly device for preassembling the sealant and barrier preassembly.

DETAILED DESCRIPTION OF THE INVENTION

Figure 1:
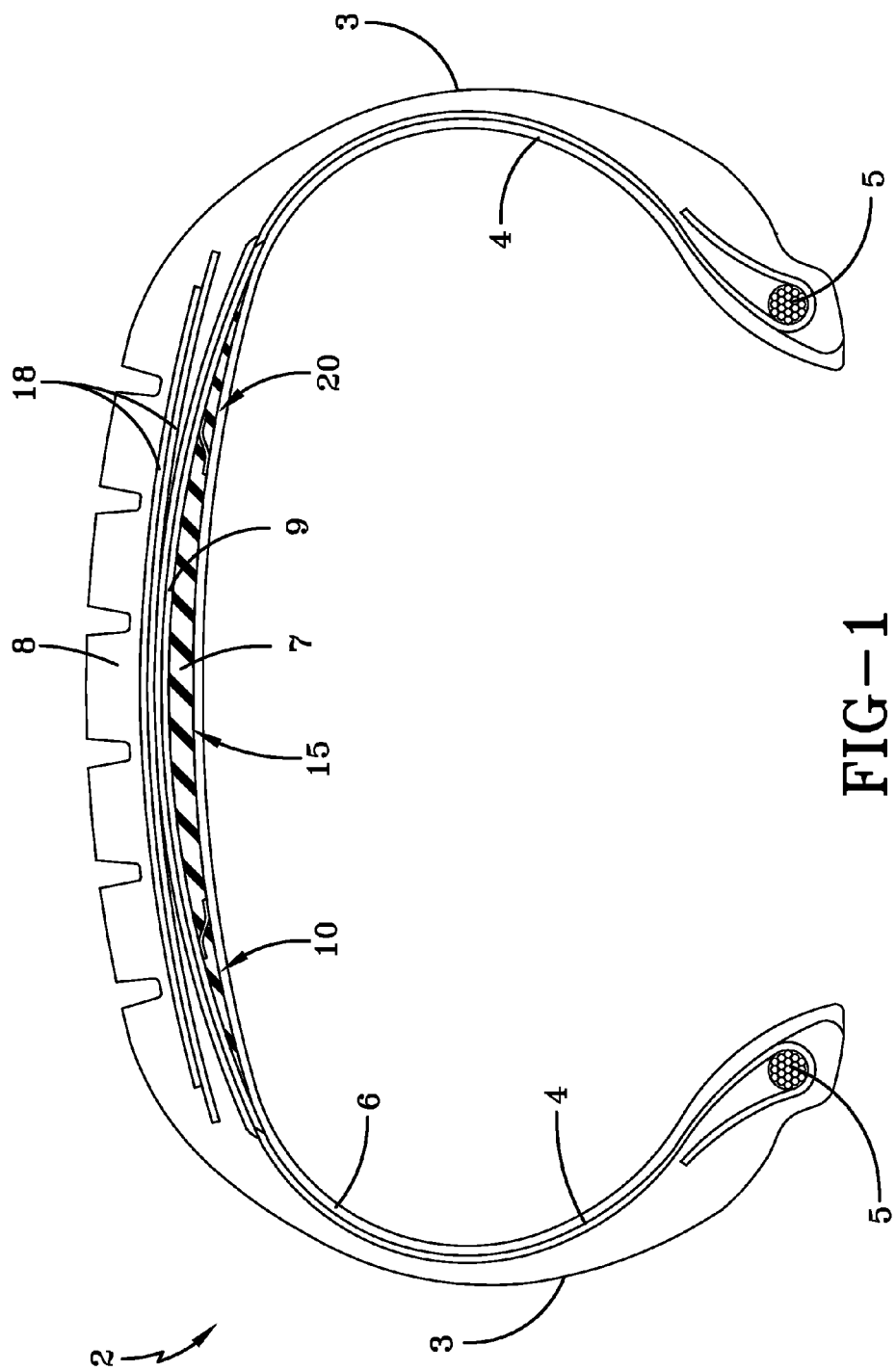
FIG. 1 is a schematic view of a cross section of tire with sealant.

Referring now to FIG. 1, there is illustrated a cross-sectional view of a self-sealing pneumatic tire constructed in accordance with the invention. The tire may be any type of tire. For example, a truck tire, a light truck tire or a passenger tire. The tire 2 includes sidewalls 3, a supporting tire carcass 4, a pair of beads 5, an inner liner 6, a layer of sealant 7, an optional cover layer 9 and an outer circumferential tread 8. The sidewalls 3 extend radially inward from the axial outer edges of the tread portion 8 to join the respective beads. The carcass 4 acts as a support structure for the tread and sidewalls, and is comprised of one or more layers of ply. Sealant layer 7 is shown disposed between the inner liner 6 and an elastomer cover layer 9 such as for example, a rubber layer, a ply layer or an optional barrier layer. The optional cover layer 9 may have a width sized to cover the sealant layer such as from shoulder to shoulder, or may further extend down into the bead area between the ply and innerliner. The sealant layer 7 may also be disposed at different locations as described in more detail, below. The tread region 8 forms a crown region of the carcass. In the interior region of the tread, there is generally found one or more belts 18. The surface region of the tread forms a tread pattern.

Sealant Composition

The sealant 7 may comprise any suitable sealant composition known to those skilled in the art, such as rubber or elastomer compositions and plastic compositions. One suitable polymer composition suitable for use is described in U.S. Pat. No. 4,895,610, the entirety of which is incorporated by reference. The polymer compositions described therein include the following composition by weight: 100 parts of a butyl rubber copolymer, about 10 to about 40 parts of carbon black, about 5 to about 35 parts of an oil extender, and from about 1 to 8 parts of a peroxide vulcanizing agent. A second polymer composition includes the following composition by weight: 100 parts of a butyl rubber copolymer, about 20 to about 30 parts of carbon black, about 8 to about 12 parts of an oil extender, and from about 2 to 4 parts of a peroxide vulcanizing agent.

The sealant 7 may also comprise a colored polymer composition as described in U.S. Pat. No. 7,073,550, the entirety of which is incorporated herein by reference. The colored polymer composition is comprised of, based upon parts by weight per 100 parts by weight of said partially depolymerized butyl rubber exclusive of carbon black:

(A) a partially organoperoxide-depolymerized butyl rubber as a copolymer of isobutylene and isoprene, wherein said butyl rubber, prior to such depolymerization, is comprised of about 0.5 to about 5, preferably within a range of from 0.5 to one, percent units derived from isoprene, and correspondingly from about 95 to about 99.5, preferably within a range of from 99 to 99.5, weight percent units derived from isobutylene;

(B) particulate reinforcing filler comprised of:
   (1) about 20 to about 50 phr of synthetic amorphous silica, preferably precipitated silica, or
   (2) about 15 to about 30 phr synthetic amorphous silica, preferably precipitated silica, and about 5 to about 20 phr of clay, preferably kaolin clay, or
   (3) about 15 to about 30 phr synthetic amorphous silica, preferably precipitated silica, and about 5 to about 20 phr of calcium carbonate,
   (4) about 15 to about 30 phr synthetic amorphous silica, preferably precipitated silica, about 5 to about 15 phr of clay, preferably kaolin clay, and about 5 to about 15 phr of calcium carbonate;

(C) from zero to 6, alternately about 0.5 to about 5, phr of short organic fibers (D) a colorant of other than a black color wherein said colorant is selected from at least one of organic pigments, inorganic pigments and dyes, preferably from organic pigments and inorganic pigments;

(E) from zero to about 20, alternately about 2 to about 15, phr of rubber processing oil, preferably a rubber processing oil having a maximum aromatic content of about 15 weight percent, and preferably a naphthenic content in a range of from about 35 to about 45 weight percent and preferably a paraffinic content in a range of about 45 to about 55 weight percent.

Another sealant polymer composition which may be utilized by the invention is described in U.S. Pat. No. 6,837,287, the entirety of which is hereby incorporated by reference.

Further, any sealant polymer composition may also be used with the invention that has a polymer composition of butyl rubber and an organoperoxide vulcanizing agent which becomes activated at high temperatures above 100 deg C.

Tire Configuration With Sealant

FIG. 1 illustrates one example of a sealant configuration for a tire. The sealant is comprised of two or more zones, preferably two or more axially outer zones 10, 20 located between the shoulder portion and the center portion of the tire and one or more axially inner zones 15 located in the center portion of the tire.

Figure 2:
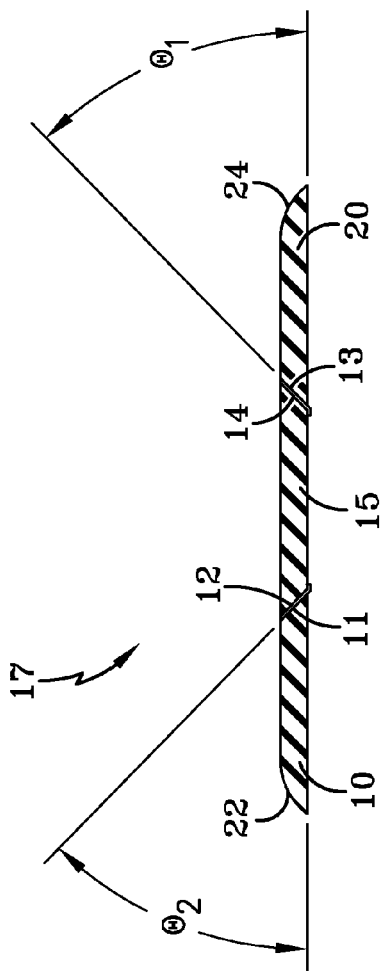
FIG. 2 is a cross sectional view of the sealant and barrier preassembly.
Figure 3:
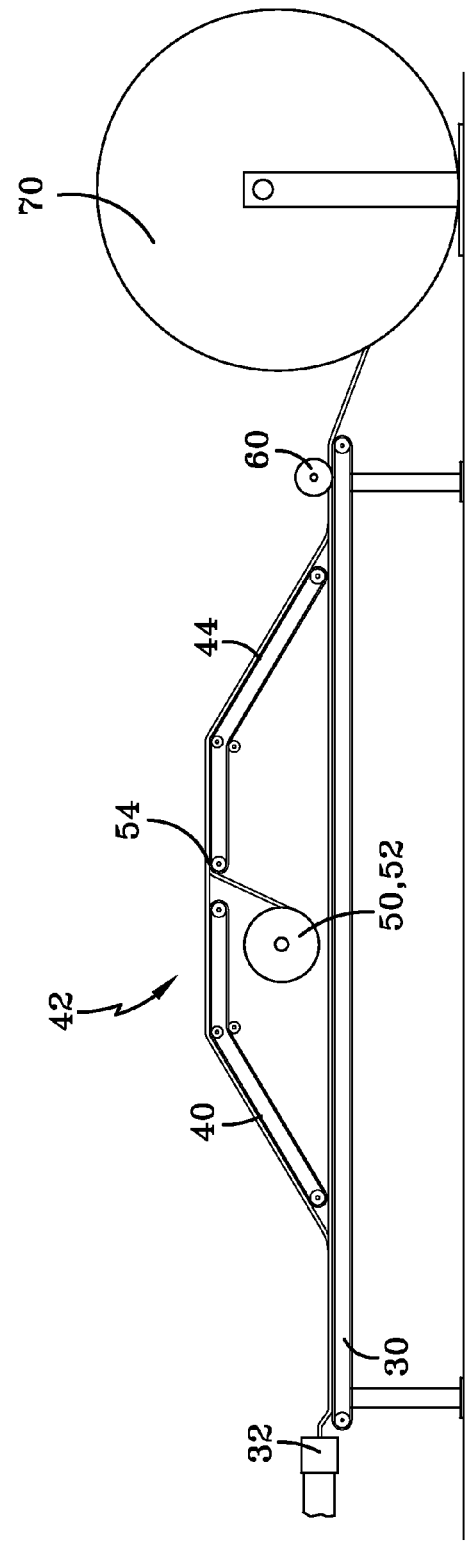
FIG. 3 is a schematic view of a first embodiment of an assembly device for preassembling the sealant and barrier preassembly.

FIG. 2 illustrates a preassembly 17 of the sealant of the present invention. FIG. 3 illustrates an apparatus to make the preassembly of FIG. 2. The sealant preassembly 17 is assembled together prior to mounting upon a tire building drum. The axially outer zones 10, 20 and the center zone 15 are extruded by a gear pump or extruder 32 directly onto a conveyor belt 30. Each zone has been extruded into its desired shape, such as shown in FIG. 2. The center zone 15 is extruded in the center of the conveyor belt 30 with an axially outer zone 10,20 located on either side of the center zone 15. The conveyor belt is advanced forward wherein only the center zone 15 of the sealant is taken up by a second conveyor belt 40. The axially outer zones 10,20 continue on first conveyor belt 30, advancing towards the end of the conveyor belt 30.

The second conveyor belt 40 advances the center zone of sealant 15 to a divider strip applier station. The center zone 15 has angled edges 11,13, which may be angled with respective angles $\theta_1, \theta_2$ in the range of about 10 degrees to about 90 degrees, more typically in the range of about 30 to about 60 degrees. At the divider strip applier station 42, a divider strip 12,14 is applied to each of the edges 11,13 of the center zone. The divider strip may be a continuous strip of elastomer, gum strip of rubber, fabric, dipped fabric, or any other suitable material known to those skilled in the art (hereinafter, "divider strip"). The divider strip has a sufficient width to extend along the entire angled edges. Preferably, the divider strip is a strip of gum rubber.

Preferably, the divider strips 12, 14 are applied simultaneously, although not required. Two divider strip rolls 50, 52 are located underneath or on either side of the second conveyor belt 40. If the divider strip rolls 50, 52 are located underneath, then each divider strip is fed in between a gap in the conveyor belt 40 and a second upper conveyor belt 44. Each divider strip is applied to each of the edges 11, 13 with a roller 54 or other equivalent mechanism. Each divider strip is preferably fed continuously and applied to the edges 11, 13. The rollers 54 applies pressure to ensure that the divider strip adheres sufficiently to the center section 15. The center zone 15 with the applied divider strips is conveyed via the second upper conveyor 44 onto the first conveyor belt 30. As the center zone is conveyed onto the first conveyor belt, the sidewalls 11, 13 with the applied divider strips engage the sidewalls of the axially outer zones 22,24. As the sealant assembly is conveyed towards the end of conveyor 30, the sealant assembly 7 passes under pressure guide roll 60 to stitch the center and outer sections together, as shown in FIG. 2. After the sealant assembly is stitched together, the sealant assembly is wound onto a spool 70 and transported to a tirebuilding machine.

FIG. 4 illustrates a second embodiment of a sealant preassembly 100. The sealant preassembly is the same as FIG. 2 embodiment, except for the following difference. The edges 11, 13 of the center zone are angled at respective angles $\theta_1, \theta_2$ in the range of about 100 degrees to about 160 degrees, more typically in the range of about 110 to about 150 degrees with respect to horizontal plane. FIG. 5 illustrates the apparatus for making the sealant preassembly 100. As shown in FIG. 5, the axially outer zones 10, 20 and the center zone 15 are extruded by a gear pump or extruder 32 directly onto a conveyor belt 30. Each zone has been extruded into its desired shape, such as shown in FIG. 4. The center zone 15 is extruded in the center of the conveyor belt 30 with an axially outer zone 10, 20 located on either side of the center zone 15. The conveyor belt is advanced forward wherein only the center zone 15 of the sealant is taken up by a second conveyor belt 40. The axially outer zones 10, 20 continue on first conveyor belt 30, advancing towards the end of the conveyor belt 30.

The second conveyor belt 40 advances the center zone of sealant 15 to a divider strip applier station. At the divider strip applier station 42, a divider strip 12, 14 is applied to each of the edges 11, 13 of the center zone. Two divider strip rolls 50, 52 are located above the second conveyor belt 40. Each divider strip is applied to each of the edges 11, 13 with a roller 54 or other equivalent mechanism. The roller is located adjacent the center zone. Each divider strip is preferably fed continuously and applied to the edges 11, 13. The rollers 54 applies pressure to ensure that the divider strip adheres sufficiently to the center section 15. The center zone 15 with the applied divider strips is then conveyed onto the first conveyor belt 30. As the center zone is conveyed onto the first conveyor belt, the sidewalls 11,13 with the applied divider strips engage the sidewalls of the axially outer zones 22,24.

As the sealant assembly is conveyed towards the end of conveyor 30, the sealant assembly 7 passes under pressure guide roll 60 to stitch the center and outer sections together, as shown in FIG. 2. After the sealant assembly is stitched together, the sealant assembly is wound onto a spool and transported to a tirebuilding machine.

The thickness of the sealant in each of the zones 10, 15, 20 can vary greatly in an unvulcanized puncture sealant-containing tire. Generally, the thickness of the sealant composition layer may range from about 0.13 cm (0.05 inches) to about 1.9 cm (0.75 inches). In passenger and truck tires it is normally desired for the sealant composition layer to have a thickness of about 0.32 cm (0.125 inches). The sealant width may vary depending upon the tire size, but may typically be in the range of about 3 to 6 inches.

After the unvulcanized pneumatic rubber tires of this invention are assembled they are vulcanized using a normal tire cure cycle. The tires of this invention can be cured over a wide temperature range depending somewhat upon the size of the tire and the degree of desired depolymerization of the butyl rubber as well as the thickness of the sealant layer itself) and sufficient to at least partially depolymerize said sealant precursor layer to the aforesaid storage modulus (G') physical property.

While certain representative embodiments and details have been shown for the purpose of illustrating the invention, it will be appreciated there is still in the art various changes and modifications may be made therein without departing from the spirit or scope of the invention.

What is claimed is:

1. A method of making a preassembled sealant comprising the steps of:
   Extruding a center strip and at least two axially outer strips of a sealant onto a first conveyor belt; wherein the center strip and the axially outer strips are in a side by side adjacent relationship, wherein the center strip is conveyed up onto a second conveyor while the axially outer strips are conveyed on the first conveyor belt towards the end of the belt,
   wherein the center strip has two outer edges, wherein a divider strip is applied to each edge in a continuous manner, wherein the center strip is then conveyed onto the axially outer strips and then stitched together forming a preassembled component.

2. The method of claim 1 wherein the sealant axially outer zones have angled outer walls, and angled inner walls, wherein the sealant axially inner zone has mating outer walls for adjoining to the angled inner walls of said sealant axially outer zones.

3. The method of claim 1 wherein the sealant has a width in the range of about 6 to about 10 inches.

4. The method of claim 1 wherein the sealant is colored.

5. The method of claim 1 wherein the sealant is comprised of, based upon parts by weight per 100 parts by weight of said partially depolymerized butyl rubber exclusive of carbon black:
   (A) a partially organoperoxide-depolymerized butyl rubber as a copolymer of isobutylene and isoprene, wherein said butyl rubber, prior to such depolymerization, is comprised of about 0.5 to about 5 percent units derived from isoprene, and correspondingly from about 95 to about 99.5 weight percent units derived from isobutylene;
   (B) particulate reinforcing filler comprised of:
      (1) about 20 to about 50 phr of synthetic amorphous silica, or
      (2) about 15 to about 30 phr synthetic amorphous silica, preferably precipitated silica, and about 5 to about 20 phr of clay, or
      (3) about 15 to about 30 phr synthetic amorphous silica and about 5 to about 20 phr of calcium carbonate, or
      (4) about 15 to about 30 phr synthetic amorphous silica, about 5 to about 15 phr of clay and about 5 to about 15 phr of calcium carbonate;
   (C) from zero to 6 phr of short organic fibers;
   (D) a colorant of other than a black color wherein said colorant is selected from at least one of organic pigments, inorganic pigments and dyes; and
   (E) from zero to about 20 phr of rubber processing oil.

6. A method of making a preassembled sealant comprising the steps of:
   Extruding a first and second strip of a sealant onto a first conveyor belt; wherein the strips are in a side by side adjacent relationship, wherein the first strip is conveyed up onto a second conveyor while the other strip is conveyed on the first conveyor belt towards the end of the belt,
   wherein a divider strip is applied to an inner edge of the first strip in a continuous manner, wherein the first strip is then conveyed onto the first conveyor belt and joined with the second strip such that the divider strip is located between the first and second strip.

* * * * *